United States Patent [19]

Espenshade

[11] Patent Number: 5,772,235
[45] Date of Patent: Jun. 30, 1998

[54] CONVERTIBLE STROLLER

[75] Inventor: Gregg R. Espenshade, Bowmansville, Pa.

[73] Assignee: Graco Children's Products Inc., Elverson, Pa.

[21] Appl. No.: 556,056

[22] Filed: Nov. 9, 1995

[51] Int. Cl.[6] .................................................. B62B 7/12
[52] U.S. Cl. ........................ 280/643; 280/648; 280/658; 297/184.13; 403/104
[58] Field of Search ................................. 280/643, 648, 280/644, 650, 47.4, 655.1, 658, 657; 403/104, 106, 109, 329; 296/35.4; 297/487, 184.13

[56] References Cited

U.S. PATENT DOCUMENTS

| 1,576,075 | 3/1926 | Tisdell | 280/643 |
|---|---|---|---|
| 2,872,203 | 2/1959 | Hedstrom | 280/643 |
| 3,330,575 | 7/1967 | Boudreau | 280/648 |
| 4,741,056 | 5/1988 | Kassai | 280/643 X |
| 5,184,835 | 2/1993 | Huang | 280/655.1 X |
| 5,516,142 | 5/1996 | Hartan | 280/655.1 X |

FOREIGN PATENT DOCUMENTS

| 481452 | 4/1992 | European Pat. Off. | 280/643 |
|---|---|---|---|
| 3901743 | 7/1989 | Germany | 280/643 |

*Primary Examiner*—Brian L. Johnson
*Assistant Examiner*—Michael Mar
*Attorney, Agent, or Firm*—Richard B. O'Planick

[57] ABSTRACT

A convertible stroller for convenient conversion between a plurality of configurations, comprising a frame structure, a back rest portion connected to the frame structure at a first pivot point to allow the back rest portion to recline between an upright and a reclined position, a foot rest portion connected to the frame structure at a second pivot point to allow the foot rest portion to rotate between a lowered position and an elevated position, and an arm bar slidably connected to the frame structure to allow the arm bar to move between a closed position and an extended position.

11 Claims, 5 Drawing Sheets

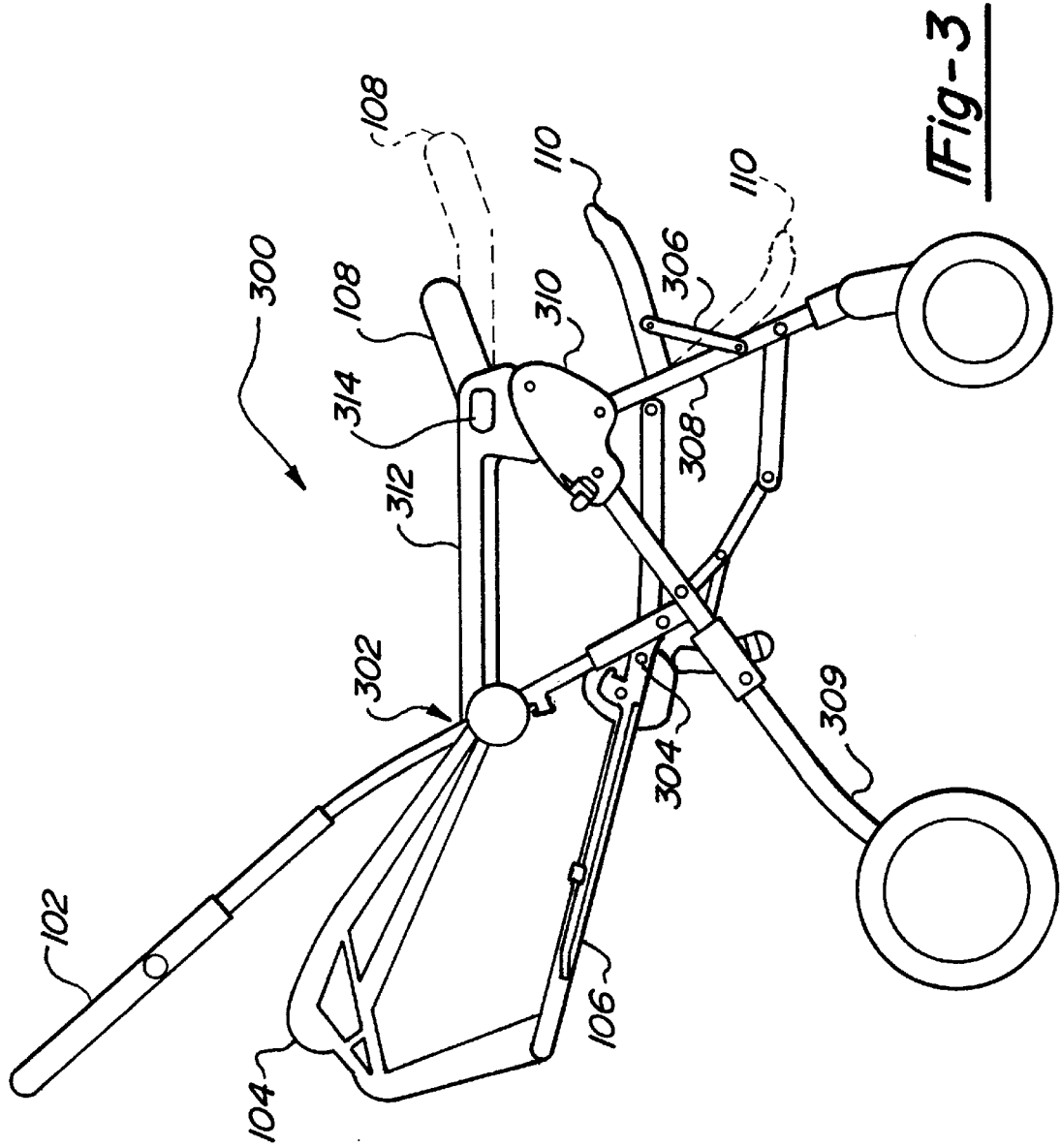

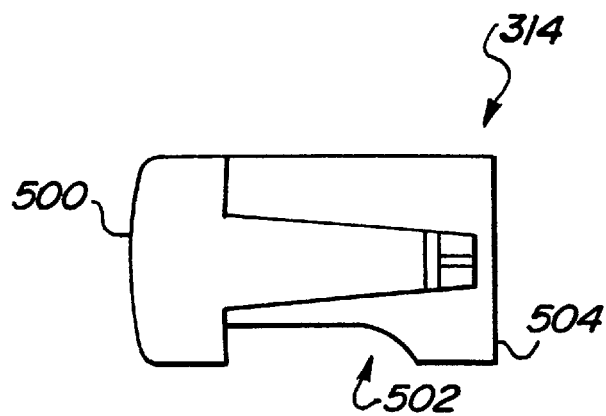
_Fig-5A_
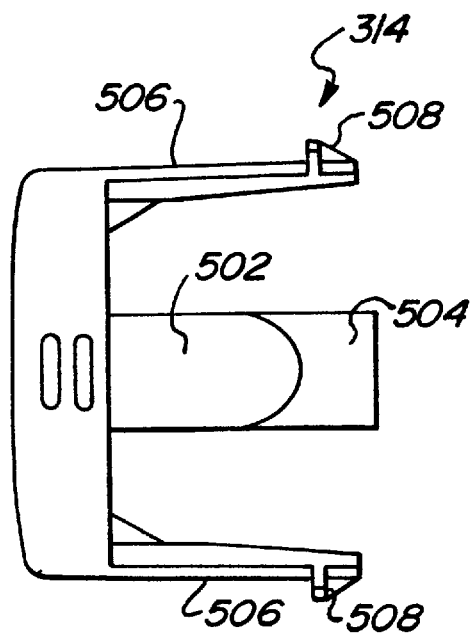
_Fig-5B_
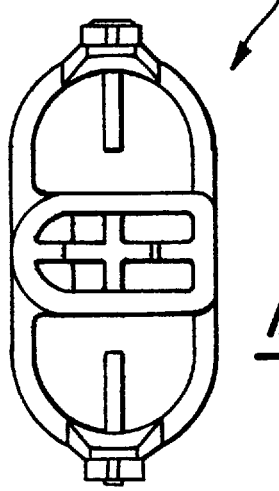
_Fig-5C_

CONVERTIBLE STROLLER

BACKGROUND OF THE INVENTION

1. Field Of The Invention

The present invention relates to a convertible stroller and, in particular, to such a stroller that can be conveniently and rapidly converted from a normal configuration to a bassinet configuration.

2. Description Of The Related Art

Conventional strollers may include a variety of features. For example, some conventional strollers may be changed to several configurations, including various reclining configurations, and various folded configurations. However, conventional strollers suffer from the drawback of not being able to conveniently and rapidly change from a normal configuration, wherein the child is generally sitting upright or reclined, to a bassinet configuration where the child (or an infant) may lie down.

SUMMARY OF THE INVENTION

The present invention has been made in view of the above circumstances, and has as an object of the present invention a convertible stroller for convenient conversion between a plurality of configurations comprising a frame structure, a back rest portion connected to the frame structure at a first pivot point to allow the back rest portion to recline between an upright and a reclined position, a foot rest portion connected to the frame structure at a second pivot point to allow the foot rest portion to rotate between a lowered position and an elevated position, and an arm bar slidably connected to the frame structure to allow the arm bar to move between a closed position and an extended position.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are included to provide a further understanding of the invention and are incorporated in and constitute a part of this specification, illustrate one embodiment of the invention and together with the written description serve to explain the principles of the invention. In the drawings:

FIG. 3 is a side view of the structural skeleton of the stroller in accordance with the present invention;

FIG. 5(a) is a side view, FIG. 5(b) is a top view, and FIG. 5(c) is an end view of a button according to the present invention.

DETAILED DESCRIPTION OF THE PREFERRED EMBODIMENTS

Reference will now be made in detail to the present preferred embodiment of the invention, an example of which is illustrated in the accompanying drawings.

Figure 1:
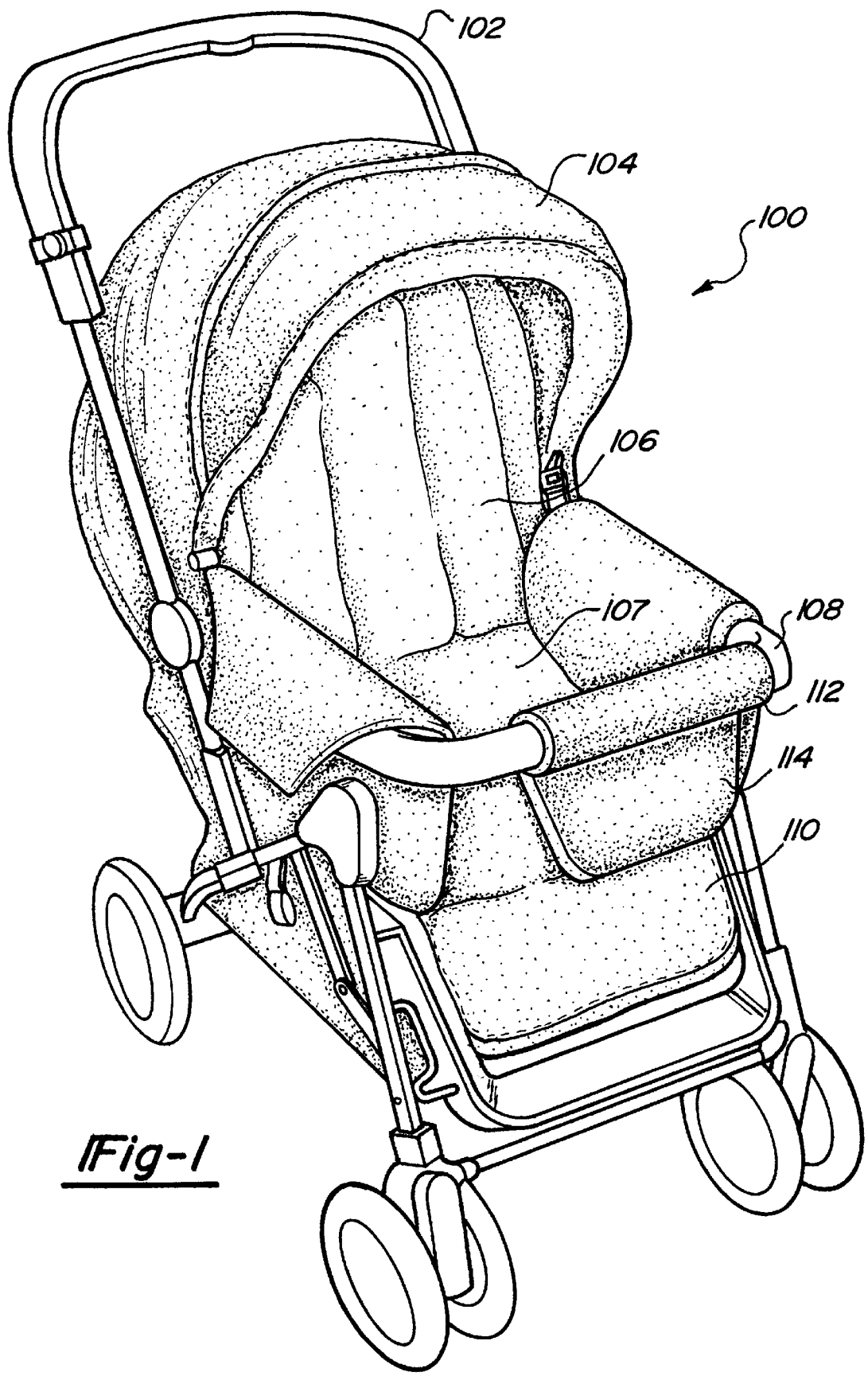
FIG. 1 is a perspective view of a stroller according to the present invention in a normal configuration.

FIG. 1 shows a stroller 100 which generally includes a handle 102, a collapsible canopy 104, an adjustable back rest portion 106, a seat portion 107, an arm bar 108, and an adjustable foot rest portion 110. The back rest portion 106 is shown in the upright position to facilitate a child sitting up, and the footrest portion 110 is shown in a lower position to allow the child's legs to extend downward. The arm bar 108 is shown with a cushion portion 112 generally surrounding a portion of the arm bar 108.

Figure 2:
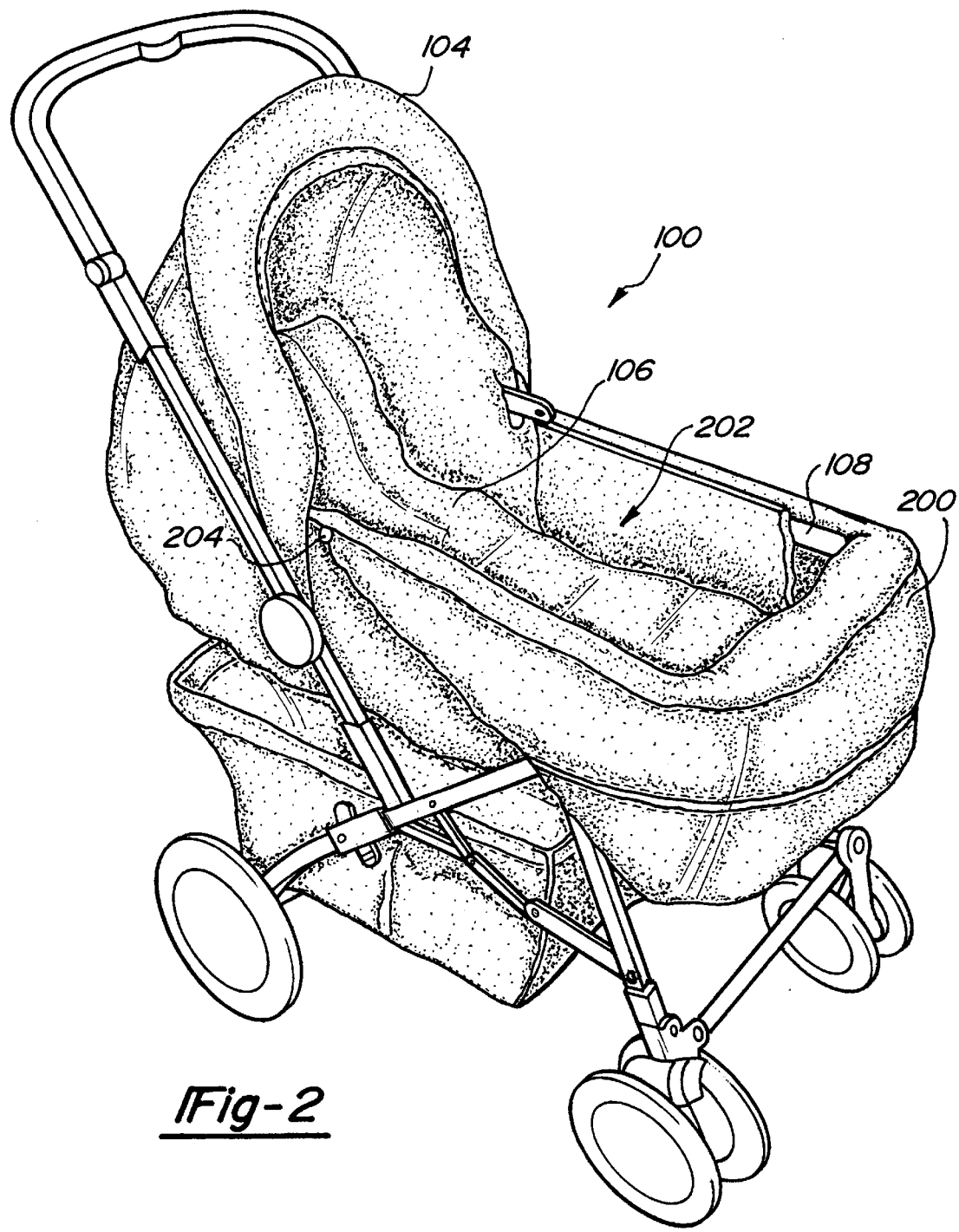
FIG. 2 is a perspective view of a stroller according to the present invention in a bassinet configuration.

FIG. 2 generally shows the stroller 100 converted into a bassinet configuration. In general, the bassinet configuration of the stroller 100 provides a bassinet area 202 wherein the backrest portion 106 is in a fully reclined position, and the arm bar 108 (only a portion of which is shown in FIG. 2) is extended in an outward direction. The leg rest 110 (not shown in FIG. 2) has been rotated upward to a substantially level position to form a lower portion of the bassinet area 202. The bassinet configuration further includes a boot 200 which is placed over the arm bar and to provide a side wall surrounding the bassinet area 202. The boot 200 is preferably made of an insulated cloth and fastened to the stroller 100 by means of a snap or button 204. Also, the canopy 104 is shown in an uncovered position in FIG. 2.

The details of the conversion aspects of the present invention will now be described with reference to FIGS. 3–5. FIG. 3 shows the structural skeleton 300 of the stroller in accordance with the present invention. In particular, the handle 102 is shown in a position similar to that shown in FIGS. 1 and 2. The skeleton of the collapsible canopy 104 is further shown in a fully uncovered position, and the back rest portion 106 is shown in the fully reclined position. The canopy pivots about a point generally indicated at point 302, and the back rest pivots about point 304. The foot rest portion 110 is shown in an elevated position in FIG. 3 to provide a portion of the floor for the bassinet area 202.

FIG. 3 also shows a front leg support member 308 and a rear leg support member 309. The frame structure 300 preferably includes a pair of front leg support members 308 and a pair of rear leg support members 309. A collapsing pivot point 310 is connected to an end of the front leg support member 308 and an end of the rear leg support member 309. Collapsing pivot point 310 allows the leg members 308 and 309 to collapse, thereby allowing the frame structure to fold up.

FIG. 3 further shows a side piece 312 connected to the frame structure 300 and generally for providing a guide structure for the arm bar 108. In particular, the side piece 312 generally includes a circular orifice for receiving the preferred arm bar 108 and further includes a mechanism for locking the arm bar in position. FIG. 3 shows the arm bar 108 in the closed position in solid line, and in an extended position by dashed line. As part of the locking mechanism, the side piece includes a button 314 for use in locking the arm bar in its desired position. Of course, it should be understood that the arm bar could be removed from the structural skeleton to provide yet another configuration.

The foot rest portion 110 is also shown in FIG. 3 in a dashed line in the normal downward position shown in FIG. 1. A locking member 306 is shown connected to a front leg support member 308 and an intermediate point in the foot rest 110. The locking member 306 preferably comprises a wire which slides in a groove with a notch to lock the foot rest portion 110 in the desired positions. As can be seen, a substantially flat bassinet bed area is created by the full reclined back rest portion 106, the seat portion 107, and the elevated foot rest portion 110.

To install the boot 200 shown in FIG. 2, the user simply extends the preferred cloth structure over the extended arm bar 108 (shown in dashed lines in FIG. 3) and over the elevated foot rest portion 110 to a configuration as shown in FIG. 2. The boot is fastened to the frame structure by a snap or button 204. Preferably, the boot is a cloth material, and may be insulated to retain the warmth of the child in the bassinet area. Additionally, the boot 200 may include a cover portion (not shown), preferably of a cloth material, which can cover the bassinet area 202. Preferably, the cover portion may be attached to the boot 200 by a zipper structure (not shown) at the inner edge of the boot surrounding the bassinet structure. Of course, the zipper may be partially closed to only partially cover the bassinet area as desired.

Figures 4A, 4B:
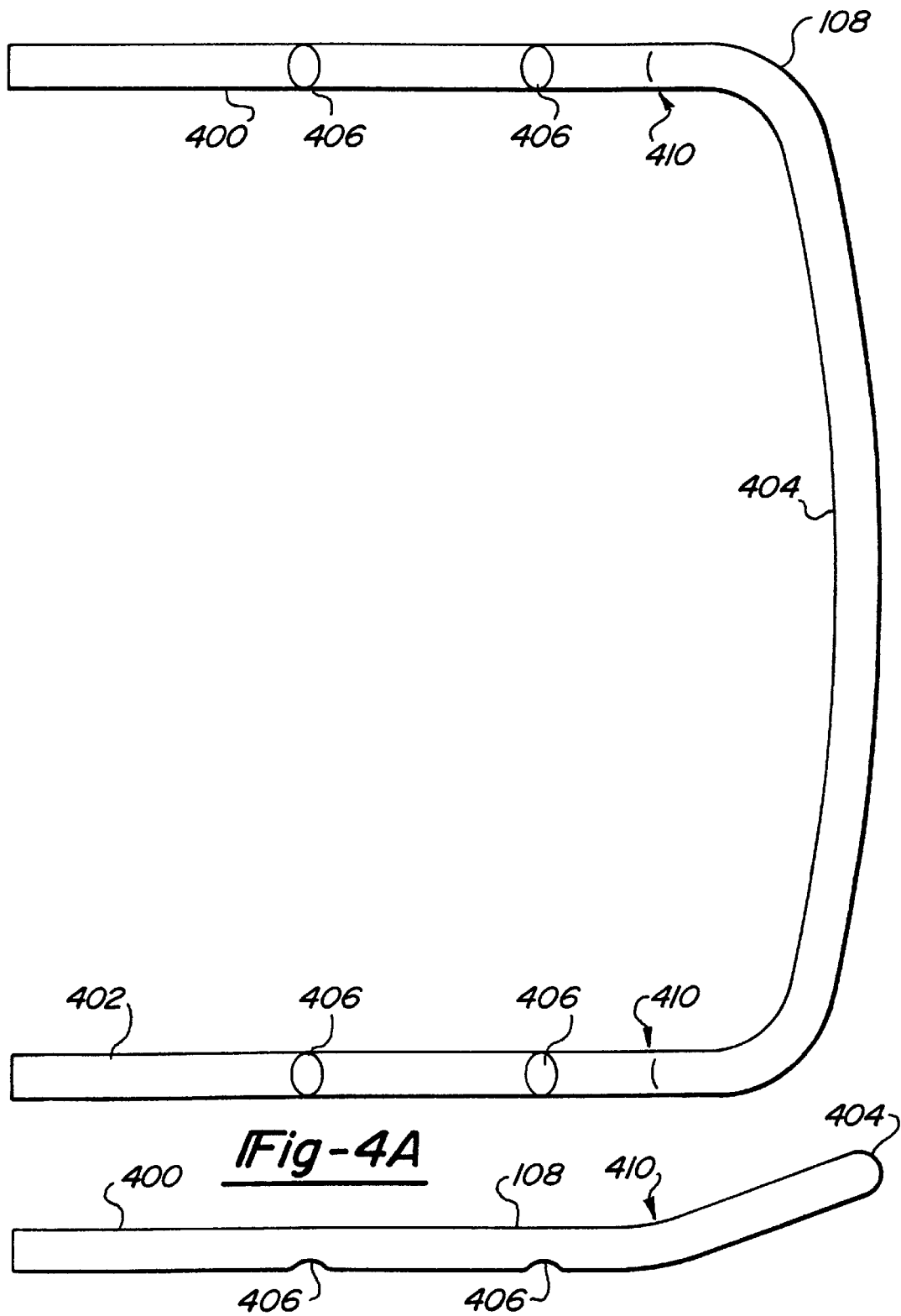
FIG. 4(a) is a bottom view and FIG. 4(b) is a side view of the arm bar according to the present invention.

FIG. 4(a) shows a bottom view of a preferred arm bar 108 in accordance with the present invention. In particular, the arm bar 108 generally comprises a U-shaped member, preferably a hollow steel tube, including two side portions 400 and 402 and a center portion 404. The cushioned portion 112 is not shown in FIG. 4. Each side portion includes a plurality of dimples 406. FIG. 4(b) shows a side view of the arm bar 108 and shows a bend in the bar generally indicated at area 410 which causes the center member to extend upwards slightly. FIG. 4(b) also shows a side view of the side member 400 and the dimples 406.

FIG. 5 shows a side, top, and end view of the button 314 according to a preferred embodiment of the present invention. As can be seen in FIG. 5(a), the button 314 includes an end 500 to be pushed by the user. A notch 502 and protruding portion 504 are also shown in FIG. 5 (a). As explained below, the protruding portion 504 engages with the dimples 406 on the arm bar 108 to lock the arm bar in place.

FIG. 5(b) shows a top view of the button 314 and generally shows two side portions 506 each including tab ends 508. Side portions 506 and tab ends 508 operate to secure the button in the side piece 312 shown in FIG. 3. Preferably, the side piece 312 includes an oval orifice (not shown) to receive the button 314 and an appropriate inner lip (not shown) such that the side portions 506 are compressed slightly upon insertion, and the tab ends 508 snap into position and secure the button in place against the inner lip of the orifice (not shown). FIG. 5(c) shows an end view of the button 314.

During operation, the button is preferably biased outward by a spring (not shown) such that the extending portion 504 is engaged with a dimple 406 on the arm bar 108. To adjust the position of the arm bar 108, the user depresses the button 314 such that the notch 502 is adjacent the dimples and thereby allows the circular arm bar 108 to slide. As the arm bar 108 slides to the new position, the spring (not shown) biases the button 314 to cause the extending portion 504 to engage with the appropriate dimple 406, thereby locking the arm bar in place. With this procedure, the arm bar 108 can be adjusted to the closed or extended position.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A convertible stroller for convenient conversion between a plurality of configurations, comprising:
   a frame structure;
   a back rest portion connected to the frame structure at a first pivot point to allow the back rest portion to recline between an upright and a reclined position;
   a foot rest portion connected to the frame structure at a second pivot point to allow the foot rest portion to rotate between a lowered position and an elevated position;
   an arm bar slidably connected to the frame structure to allow the arm bar to move between a closed position and an extended position, the arm bar comprising a generally U-shaped tube including a first and a second side portion each having a longitudinal direction and a center portion, the first and second side portions having a plurality of indentations; and
   a button for engaging with the plurality of indentations on the arm bar to lock the arm bar in selected position, said button being disposed transverse to the longitudinal direction of the first and second side portions.

2. The convertible stroller of claim 1, wherein the frame structure includes a pair of front leg support members and a pair of rear leg support members and a handle support member mounted substantially at a mid-point of the pair of rear leg support members.

3. The convertible stroller of claim 2, wherein each of said front and rear leg support members has a first and second end, each of said front and rear leg support members has a wheel attached to said first end, and each front leg support member is rotationally connected at its second end to a corresponding second end of one of the rear leg support members at a collapsing pivot point to allow the frame structure to fold up.

4. The convertible stroller of claim 1, further comprising a boot for covering the arm bar in the extended position.

5. The convertible stroller of claim 4, wherein the boot is comprised of an insulated fabric material.

6. The convertible stroller of claim 1, wherein said center portion of said arm bar extends upwards.

7. The convertible stroller of claim 1, wherein said indentations comprise dimples.

8. The convertible stroller of claim 1, further comprising a collapsible canopy.

9. A convertible stroller as recited in claim 1, wherein said button further includes at least one tab end that snaps said button into slidable association with a respective side portion.

10. A convertible stroller as recited in claim 9 wherein said end is globally oval in shape.

11. A convertible stroller for convenient conversion between a plurality of configurations, comprising:
    a frame structure including a pair of front leg support members and a pair of rear leg support members and a handle support member mounted substantially at a mid-point of the pair of rear legs support members, wherein each of said front and rear leg support members has a first and second end, each of said front and rear leg support members has a wheel attached to said first end and each front leg support member is rotationally connected at its second end to a corresponding second end of one of the rear leg support members at a collapsing pivot point to allow the frame structure to fold up;
    a back rest portion connected to the frame structure at a first pivot point to allow the back rest portion to recline between an upright and a reclined position;

a foot rest portion connected to the frame structure at a second pivot point to allow the foot rest portion to rotate between a lowered position and an elevated position;

an arm bar slidably connected to the frame structure to allow the arm bar to move between a closed position and an extended position, the arm bar comprising a generally U-shaped tube including a first and a second side portion each having a longitudinal direction and a center portion, the first and second side portions having a plurality of indentations;

a button for engaging with the plurality of indentations on the arm bar to lock the arm bar in a selected position, said button being disposed transverse to the longitudinal direction of the first and second side portions, said button including an end portion, a protruding portion having a notch, said protruding portion extending perpendicularly relative to said end portion, and a spring associated with said button for biasing said protruding portion into engagement with said indentations, said notch permitting free sliding movement of said arm bar relative to said frame structure when said button is depressed;

a boot for covering the arm bar in the extended position; and a collapsible canopy.

* * * * *

UNITED STATES PATENT AND TRADEMARK OFFICE
CERTIFICATE OF CORRECTION

PATENT NO. : 5,772,235
DATED : June 30, 1998
INVENTOR(S) : Gregg R. Espenshade

It is certified that error appears in the above-identified patent and that said Letters Patent is hereby corrected as shown below:

Please insert the following:

Column 4, Claim 1,
The last line, after "portions.":

--, said button including an end portion, a protruding portion having a notch, said protruding portion extending prependicularly relative to said end portion, and a spring associated with said button for biasing said protruding portion into engagement with said indentations, said notch permitting free sliding movement of said arm bar relative to said frame structure when said button is depressed --.

Signed and Sealed this

Twenty-first Day of August, 2001

Attest:

NICHOLAS P. GODICI
Attesting Officer    Acting Director of the United States Patent and Trademark Office